US009120982B2

(12) United States Patent
Nousiainen et al.

(10) Patent No.: US 9,120,982 B2
(45) Date of Patent: Sep. 1, 2015

(54) PROCESS AND APPARATUS FOR PRODUCING HYDROCARBONS

(75) Inventors: Jaakko Nousiainen, Lappeenranta (FI); Arto Rissanen, Lappeenranta (FI); Andrea Gutierrez, Lappeenranta (FI); Teemu Lindberg, Lappeenranta (FI); Heli Laumola, Helsinki (FI); Pekka Knuuttila, Porvoo (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 444 days.

(21) Appl. No.: 13/450,260

(22) Filed: Apr. 18, 2012

(65) Prior Publication Data

US 2012/0260565 A1 Oct. 18, 2012

Related U.S. Application Data

(60) Provisional application No. 61/476,521, filed on Apr. 18, 2011.

(51) Int. Cl.
*C10G 3/00* (2006.01)
*C10L 1/08* (2006.01)
*B01J 8/04* (2006.01)

(52) U.S. Cl.
CPC ............. *C10G 3/50* (2013.01); *B01J 8/0453* (2013.01); *B01J 8/0492* (2013.01); *C10G 3/46* (2013.01); *C10G 3/48* (2013.01); *C10G 3/49* (2013.01); *C10G 3/54* (2013.01); *C10L 1/08* (2013.01); *B01J 2208/00274* (2013.01); *B01J 2208/025* (2013.01); *C10G 2300/1014* (2013.01); *C10G 2300/1018* (2013.01); *C10G 2300/4018* (2013.01); *C10G 2400/02* (2013.01); *C10G 2400/04* (2013.01)

(58) Field of Classification Search
CPC ............. C10L 1/08; C10G 3/50; C10G 3/46; C10G 3/49; C10G 3/54; B01J 8/0492; B01J 8/0453
USPC .................................................. 44/308, 388
See application file for complete search history.

(56) References Cited

U.S. PATENT DOCUMENTS 4,222,855 A 9/1980 Pelrine et al.
4,229,282 A 10/1980 Peters et al.
(Continued)

FOREIGN PATENT DOCUMENTS

EP 1 396 531 A2 3/2004
FI 100248 B 10/1997
(Continued)

OTHER PUBLICATIONS

Ekbom et al., Black Liquor Gasification with Motor Fuel Production—BLGMF II, http://www.nykomb-consulting.se/BLGMFII, 2005.
(Continued)

*Primary Examiner* — Cephia D Toomer
(74) *Attorney, Agent, or Firm* — Birch, Stewart, Kolasch & Birch, LLP

(57) ABSTRACT

The present invention relates to a process for catalytically converting material of biological origin into hydrocarbons useful as fuel components. The process includes hydrodeoxygenation and isomerization of the material. The present invention relates also to a reactor and an apparatus suitable for use in the process.

12 Claims, 3 Drawing Sheets

(56) References Cited

U.S. PATENT DOCUMENTS

| | | | |
|---|---|---|---|
| 4,247,388 | A | 1/1981 | Banta et al. |
| 4,592,762 | A | 6/1986 | Babu et al. |
| 4,968,325 | A | 11/1990 | Black et al. |
| 4,992,605 | A | 2/1991 | Craig et al. |
| 5,705,722 | A | 1/1998 | Monnier et al. |
| 5,833,837 | A | 11/1998 | Miller |
| 7,232,935 | B2 * | 6/2007 | Jakkula et al. ............. 585/240 |
| 7,279,018 | B2 | 10/2007 | Jakkula et al. |
| 2002/0143219 | A1 | 10/2002 | Price et al. |
| 2004/0230085 | A1 | 11/2004 | Jakkula et al. |
| 2004/0256287 | A1 | 12/2004 | Miller et al. |
| 2007/0010682 | A1 | 1/2007 | Myllyoja et al. |
| 2007/0068848 | A1 | 3/2007 | Monnier et al. |
| 2007/0161832 | A1 | 7/2007 | Myllyoja et al. |
| 2007/0225383 | A1 | 9/2007 | Cortright et al. |
| 2009/0300970 | A1 | 12/2009 | Perego et al. |
| 2010/0317903 | A1 | 12/2010 | Knuuttila |
| 2012/0004477 | A1 * | 1/2012 | Dougherty et al. .......... 585/240 |

FOREIGN PATENT DOCUMENTS

| | | |
|---|---|---|
| WO | WO 96/18704 A1 | 6/1996 |
| WO | WO 2007/027669 A1 | 3/2007 |
| WO | WO 2009/011639 A2 | 1/2009 |
| WO | WO 2009/059936 A2 | 5/2009 |
| WO | WO 2009/131510 A1 | 10/2009 |
| WO | WO 2009/152873 A1 | 12/2009 |
| WO | WO 2010/028717 A2 | 3/2010 |
| WO | WO 2010/128208 A2 | 11/2010 |
| WO | WO 2011/148045 A1 | 12/2011 |
| WO | WO 2011/148046 A1 | 12/2011 |

OTHER PUBLICATIONS

Fernandes et al., "Modeling and Optimization of Fischer-Tropsch Products Hydrocracking", Fuel Processing Technology, vol. 88, No. 2, 2007, pp. 207-214.

FI 20105583 abstract only.

FI 20105585 abstract only.

Liu et al., "Production of High Quality Cetane Enhancer from Depitched Tall Oil", Petroleum Science and Technology, vol. 16, Iss 5&6, 1998, pp. 597-609.

Mills, "Status and Future Opportunities for Conversion of Synthesis Gas to Liquid Fuels", Fuel, vol. 73, No. 8, 1994, pp. 1243-1279.

Schaub et al., "Synthetische Kraftstoffe Aus Biomasse Uber Die Fischer-Tropsch-Synthese-Grundlagen Und Perspektiven", Erdoel Erogas Kohle, vol. 120, No. 10, 2004, pp. 327-331.

Tijmensen et al., "Exploration of the Possibilities for Production of Fischer Tropsch Liquids and Power Via Biomass Gasification", Biomass & Bioenergy, vol. 23, No. 2, 2002, pp. 129-152.

Translation of Chinese Office Action dated Nov. 15, 2014 for Application No. 201280029800.5.

* cited by examiner

PROCESS AND APPARATUS FOR PRODUCING HYDROCARBONS

CROSS REFERENCE TO RELATED APPLICATIONS

This nonprovisional application claims the benefit of U.S. Provisional Application No. 61/476,521 filed on Apr. 18, 2011. The entire contents of the above application is hereby incorporated by reference.

FIELD OF THE INVENTION

The present invention relates to a process for converting material of biological origin into hydrocarbons such as fuel components by a catalytic method. The present invention relates also to a reactor and an apparatus suitable for use in the process.

BRIEF DESCRIPTION OF THE INVENTION

An object of the present invention is to provide a process for converting biological feed material into at least one hydrocarbon useful as fuel and/or additive for fuel.

Another object of the present invention is to provide an apparatus for implementing the process to alleviate disadvantages of the processes known in the art. The objects of the invention are achieved by a method and an arrangement characterized by what is stated in the independent claims. The preferred embodiments of the invention are disclosed in the dependent claims.

DETAILED DESCRIPTION OF THE INVENTION

Figure 1:
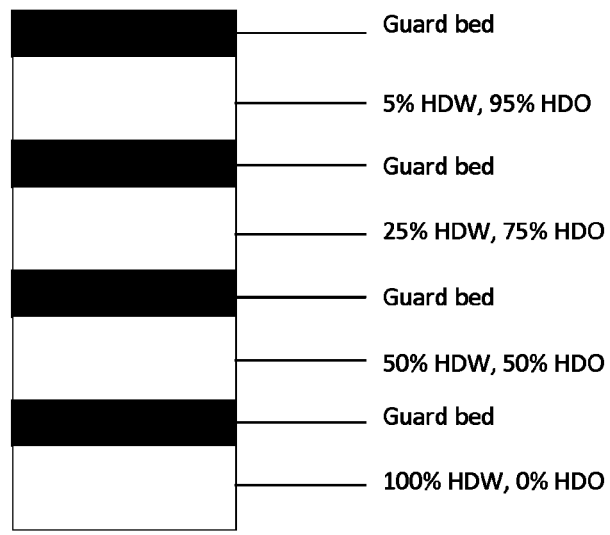
FIG. 1 illustrates the gradual mixing ratio of hydrodeoxygenation (HDO) and hydrodewaxing (HDW) catalysts.
Figure 1:
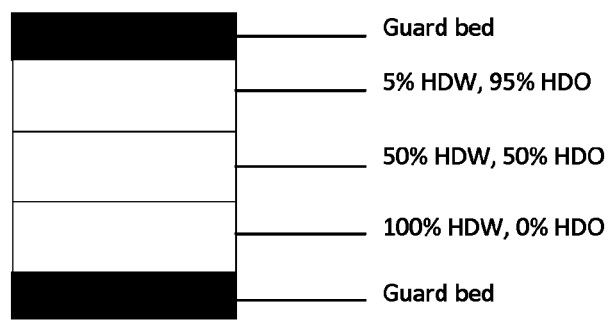
Figure 1:
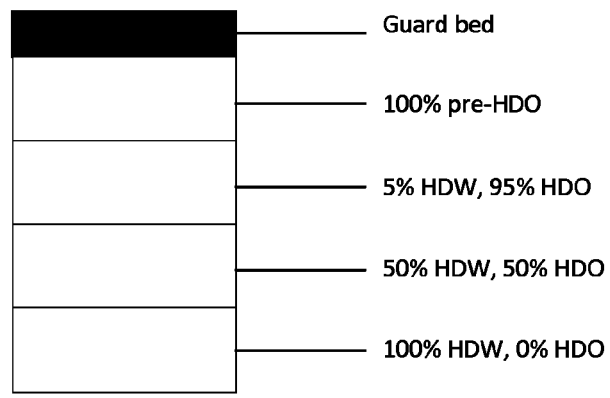

The present invention relates to a process for producing a hydrocarbon or a mixture thereof, comprising:
  providing a feed of biological material;
  subjecting the feed material into a reactor, which comprises at least two catalyst layers and comprises HDO and HDW catalysts wherein the proportion of the HDW catalyst grows towards the bottom of the reactor,
  treating by hydroprocessing and isomerisation the feed material in the reactor into at least one hydrocarbon, and
  recovering the hydrocarbon or a mixture thereof.

The feed material of biological origin can be any kind of animal and/or plant based material suitable for producing fuel components. In an embodiment, the feed material is selected from the group consisting of:
  a) plant fats, plant oils, plant waxes; animal fats, animal oils, animal waxes; fish fats, fish oils, fish waxes;
  b) fatty acids or free fatty acids obtained from plant fats, plant oils, plant waxes; animal fats, animal oils, animal waxes; fish fats, fish oils, fish waxes, and mixtures thereof by hydrolysis, transesterification or pyrolysis;
  c) esters obtained from plant fats, plant oils, plant waxes; animal fats, animal oils, animal waxes; fish fats, fish oils, fish waxes; and mixtures thereof by transesterification;
  d) metal salts of fatty acids obtained form plant fats, plant oils, plant waxes; animal fats, animal oils, animal waxes; fish fats, fish oils, fish waxes, and mixture thereof by saponification;
  e) anhydrides of fatty acids from plant fats, plant oils, plant waxes; animal fats, animal oils, animal waxes; fish fats, fish oils, fish waxes, and mixtures thereof;
  f) esters obtained by esterification of free fatty acids or plant, animal and fish origin with alcohols;
  g) fatty alcohols or adehydes obtained as reduction products of fatty acids from plant fats, plant oils, plant waxes; animal fats, animal oils, animal waxes; fish fats, fish oils, fish waxes, and mixtures thereof;
  h) recycled food grade fats and oils, and fats, oils and waxes obtained by genetic engineering;
  i) dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds;
  j) compounds derived from algae, and
  k) mixtures of the above raw materials.

In an embodiment of the invention, the biological feed material is based on a non-edible oil/fat. In another embodiment, the feed material comprises plant oil. In a further embodiment, the plant oil is obtained as by-product from forest industry.

In one embodiment of the invention, the feed material is substantially composed of crude tall oil. The term used for this kind of feed material is "tall oil" or "tall oil based material" or "crude tall oil" or "CTO". CTO is mainly composed of both saturated and unsaturated oxygen-containing organic compounds such as rosins, unsaponifiables, sterols, rosin acids (mainly abietic acid and its isomers), fatty acids (mainly linoleic acid, oleic acid and linolenic acid), fatty alcohols, sterols and other alkyl hydrocarbon derivatives. CTO is essentially free of triglycerides. Typically, CTO also contains minor amounts of impurities like inorganic sulphur compounds, residual metals such as Na, K, Ca and phosphorus. The composition of the CTO varies depending on the specific wood species. CTO is derived from pulping of coniferous wood. The term CTO also covers soap oil. Soap oil is a term referring to the oil phase obtained from tall oil soap by neutralization (typically to a pH of 7 to 8), while tall oil is provided from tall oil soap by acidification (typically to a pH of 3 to 4).

In the present invention, the raw material can be purified before it is subjected to further treatments or it can be utilized in unpurified form. Purification can be accomplished in any appropriate manner, such as by means of washing with washing liquid, filtering, distillation, degumming, depitching, evaporating etc. Also, a combination of the above mentioned purification methods can be used. Such purification methods are well known in the art and are not discussed here in further detail. Purification of the raw material may facilitate the accomplishment of the process of the invention. In case the raw material comprises CTO, the content of any harmful substances, such as metal ions, sulphur, phosphorus and lignin residuals in the CTO is reduced by the purification.

It is well known in the refinery field also to use guard beds with active materials for the removal of harmful compounds such as inorganic catalyst poisons before any hydroprocessing reactor in order to prolong the life of the catalysts. Such guard beds for purification of the feed may be provided in a separate step before the actual hydroprocessing/isomerisation/hydrocracking step.

In one embodiment of the invention, the whole amount of feed material or a part of it comprises purified CTO.

In the process of the present invention, two separate catalysts in undiluted or diluted form are loaded into a reactor, one being a hydrodeoxygenation or HDO catalyst and the other a hydrodewaxing or HDW catalyst, so that the proportion of the HDW catalyst grows towards the bottom of the reactor. As can be realized from the description and the figures, the bottom of the reactor refers to the outlet end of the reactor. Correspondingly, the top of the reactor refers to the inlet end of the reactor.

In the present invention, the HDO catalyst can be any HDO catalyst known in the art used for removal of heteroatoms from the organic compounds. In an embodiment of the invention, the HDO catalyst is selected from a group consisting of NiMo, CoMo, and a mixture of NiMo and CoMo (NiMoCo). The support for the catalyst can be selected from $Al_2O_3$, $SiO_2$, $ZrO_2$, and mixtures thereof, for example. In one embodiment of the invention, NiMo on an $Al_2O_3$ support is used. In a specific embodiment, the HDO catalyst is NiMo on an $Al_2O_3$ support with 10% addition of a HDW catalyst, which is NiW on an $Al_2O_3$ support.

In the present invention, any HDW catalyst can be used. In an embodiment of the invention, the HDW catalyst is selected from the group consisting of NiW, Pt and Pd. In another embodiment, NiW is used as the HDW catalyst. The support for the catalyst can be selected from $Al_2O_3$, zeolite, $SiO_2$, and mixtures thereof. In a specific embodiment, NiW on an $Al_2O_3$ support is used. NiW is a dewaxing catalyst which has the capability of also performing the hydrodeoxygenation and other hydrogenation reactions of biological feed materials, which are typically performed by HDO catalysts (see WO 2011/148045). In another embodiment, Pt and/or Pd catalyst on a zeolite support is used. Other support materials suitable for the HDO and/or HDW catalysts are $TiO_2$ and $CeO_2$.

According to an embodiment of the present invention, the HDO and HDW catalysts used for hydroprocessing treatment and isomerisation, respectively, are loaded/packed in a single reactor.

The reactor used in the present invention comprises at least two catalyst containing layers. In one embodiment of the invention, the reactor comprises three catalyst layers. The catalyst(s) containing layers may be separated from each others with guard bed material layers of inert material. Guard beds comprise suitable material, such as $Al_2O_3$, SiC or glass beads.

In the present invention, the HDO and HDW catalysts are mixed and packed in the reactor so that the proportion of the HDW catalyst gradually grows towards the bottom of the reactor. In an embodiment, a minor amount (1-6%) of HDW catalyst is mixed with the HDO catalyst and the mixture is loaded in the topmost section of the reactor. In another embodiment, the bottom layer comprises a minor amount (1-6%) of HDO catalyst. In another embodiment, the topmost section of the reactor is loaded with a mixture containing 5 to 10% HDW catalyst and 90 to 95% HDO catalyst. When using a HDW catalyst capable of also catalyzing hydrodeoxygenation reactions, such as NiW, the proportion of HDW catalyst in the topmost section can be higher. In a further embodiment the ratios of the HDO and HDW catalysts change gradually and the proportion of the HDW catalyst grows towards the bottom of the reactor so that the lowest catalyst layer of the reactor contains HDW catalyst as the sole catalyst.

In one embodiment of the invention, the reactor comprises two catalyst layers wherein the upper one contains 5% HDW and 95% HDO catalyst and the lower one contains 100% HDW catalyst. In another embodiment, the reactor comprises three catalyst layers, the topmost containing of 5% HDW and 95% HDO catalyst, the middle one 50% HDO and 50% HDW, and the lowest one contains 100% HDW catalyst. In a further embodiment, the reactor comprises three catalyst layers, the topmost containing of 5% HDW and 95% HDO catalyst, the middle one 75% HDW and 25% HDO, and the lowest one contains 100% HDW catalyst. In an other further embodiment, the reactor comprises four catalyst layers, the topmost containing of 5% HDW and 95% HDO catalyst, the next ones 25% HDW and 75% HDO and 50% HDW and 50% HDO catalysts, respectively and the lowest one contains 100% HDW catalyst. In an even further embodiment, the reactor comprises five catalyst layers, the topmost containing of 5% HDW and 95% HDO catalyst, the next ones 25% HDW and 75% HDO, 50% HDW and 50% HDO and 75% HDW and 25% HDO catalysts, respectively and the lowest one contains 100% HDW catalyst.

In one embodiment of the invention, the topmost catalyst layer in the reactor contains 100% of HDO catalyst. Accordingly, in one embodiment of the invention, the reactor has the topmost layer consisting of 100% HDO catalyst (pre-HDO layer) followed by layers containing 95% HDO and 5% HDW and 50% HDO and 50% HDW catalysts, respectively, and the bottom layer contains 100% HDW catalyst.

In one embodiment of the invention, the topmost catalyst layer contains 5 to 10% NiW catalyst and 90 to 95% NiMo catalyst and the bottom layer contains 100% NiW catalyst.

The catalysts can be diluted with appropriate inert mediums. Examples of inert media include glass spheres and silica. In one embodiment of the invention, at least one of the catalysts is diluted with an inert material. Accordingly, in one embodiment the reactor comprises two catalyst layers wherein the upper one comprises 5% HDW and 95% HDO catalyst and inert material and the lower one comprises 100% HDW catalyst in diluted or undiluted form. In another embodiment, the reactor comprises five catalyst layers wherein the topmost layer comprises 20% HDO catalyst, 5% HDW catalyst and 75% inert material, the second layer comprises 25% HDO catalyst, 10% HDW catalyst and 65% inert material. The third layer comprises 25% HDO catalyst, 25% HDW catalyst and 50% inert material and the fourth layer comprises 10% HDO catalyst, 50% HDW catalyst and 40% inert material. The fifth layer comprises 80% HDW catalyst and 20% inert material.

In one embodiment of the invention, an inert guard bed layer is arranged as the uppermost layer of the reactor to bind elements and/or compounds harmful for the active catalysts. In another embodiment, an inert guard bed is arranged as the bottom layer of the reactor. In a further embodiment, inert guard beds are arranged between some or all of the catalyst layers in the reactor. In an even further embodiment, inert guard beds are arranged as the uppermost layer of the reactor, between all of the catalyst layers and as the bottom layer of the reactor. The feed material can also be directed through active guard bed(s) as is common in the art.

Examples of reactors according to the present invention are illustrated in FIG. 1.

The packing/loading of the reactor can be performed as several layers/beds between which hydrogen can be led to control the temperature. The catalysts in the separate layers can be formed of catalyst granules of different size and form. Further, the amounts of active HDO and HDW catalyst as well as the amount of active metals (e.g. Ni, Mo, Co, W, Pd, Pt) in the active catalyst may vary. In one embodiment of the invention, the amount of the active catalyst(s) and the active metals increases from the top of the reactor towards the bottom of the reactor. In another embodiment, the particle size of the catalysts diminishes from the top of the reactor towards the bottom of the reactor. In a further embodiment, the amount of the active catalyst(s) and the active metals increases, and the particle size of the catalysts diminish from the top of the reactor towards the bottom of the reactor. This helps in preventing blocking of the catalyst bed and reduces pressure drop in the reactor. With these arrangements the control of the temperature and/or pressure of the reactor is optimized which has an effect on the activity and selectivity of the catalysts. These factors determine the composition, characteristics and quality of the products produced and recovered by the process.

In a further embodiment of the invention, the HDO catalyst can be loaded into the reactor with a sulphur resistant wax removing catalyst.

In the hydroprocessing treatment, hydrodeoxygenation of the feed material, such as CTO, takes place. The hydrodeoxygenation reaction is catalyzed by means of a HDO catalyst. The HDO catalyst is advantageously capable of removing undesirable sulphur compounds present in the feed material, by converting the organic sulphur compounds to gaseous hydrogen sulphide. It is characteristic of the HDO catalyst that sulphur has to be present to maintain the catalytic activity of the catalyst. Advantageously, hydrogen disulphide needed for catalytic activity of the catalyst is thus simultaneously provided in the hydroprocessing treatment step from the sulphur compounds inherently present in CTO. Gaseous hydrogen sulphide can be easily discarded from the mixture of the hydrocarbon components formed in said step.

It may be necessary to supply supplementary sulphur to the process to maintain the catalytic activity of the HDO catalyst. Supplementary sulphur can be supplied in gaseous form like hydrogen sulphide, or it can be any material that produces hydrogen sulphide in the process, like organic sulphur compounds, such as dimethyl disulphide. Generally, the $H_2$ feed/$H_2S$ relation must be maintained over about 0.0001. Sulphur can be fed to the hydroprocessing treatment step together with the feed material or separately.

The amount of hydrogen gas needed to hydrogenate the olefinic bonds of the unsaturated compounds and remove the heteroatoms in the feed material is determined by the amount and type of the feed material. The amount of hydrogen needed to hydrogenate the oxygen containing compounds of the raw material also depends on the nature of the raw material. Biological oils, fats and waxes typically contain fatty acids and/or triglycerides structures, which are hydrogenated and cracked in the hydroprocessing reaction forming water and long paraffinic carbon chains. CTO is a biological raw material, which lacks triglyceride structures.

The hydroprocessing on the HDO catalyst also typically hydrogenates sulphur compounds and nitrogen compounds forming $H_2S$ and $NH_3$, respectively.

The main task of the HDW catalyst is to isomerise the long carbon chains of the biological material. Isomerisation of the carbon chains improves the cold properties of the resulting fuel product. HDW catalysts also act as hydrogenation catalysts and they also have the capacity for cracking complex molecules into fragments suitable for fuel products.

Hydrocarbons including n-paraffins obtained in the hydroprocessing treatment are subjected to isomerisation where straight carbon backbones of the n-paraffins are isomerised to isoparaffins. Isoparaffins have typically mono and di branches. Isomerisation of the carbon chains is accomplished in the presence of the HDW catalyst. Long carbon chains and complex molecules will also be subjected to some cracking by the HDW catalyst. Like the NiMo or CoMo based HDO catalyst, the NiW based HDW catalyst needs sulphur to maintain its catalytic activity. Pt and Pd based HDW catalysts perform better with feed materials which are sulphur-free or almost sulphur-free.

In addition to the capability of isomerisation of the hydrocarbon chains, the HDW catalysts have cracking properties. The isomerisation of the hydrocarbons improves the cold flow properties of diesel fuel and increases the octane number of gasoline fuel. Isomerisation performed by means of the HDW catalyst in the present invention has thus a beneficial influence on the quality of both gasoline and diesel grade fuels.

A suitable amount of hydrogen needed for the hydroprocessing and isomerisation/cracking can be determined by a man having ordinary skills in the art.

In the present invention, the pressure in the reactor can vary from about 10 to about 250 bar, preferably about 80 to about 110 bar.

The HDO and HDW treatments in the reactor are carried out at a temperature in the range of about 280° C. to about 450° C., preferably at about 350° C. to about 370° C.

The feed material is pumped to the reactor at a desired speed. The feed rate WHSV (weight hourly spatial velocity) of the feed material is proportional to an amount of the catalyst: the WHSV is calculated according to the following equation:

$$WHSV[h^{-1}] = \frac{V_{feed[g/h]}}{m_{catalyst[g]}}$$

wherein $V_{feed[g/h]}$ means the pumping velocity of the feed material, and $m_{catalyst[g]}$ means the amount of the catalyst.

The WHSV of the feed material in the present invention varies between 0.1 and 5, and is preferably in the range of 0.3-0.7.

The ratio of $H_2$/feed in the present invention varies between 600 and 4000 Nl/l, and is preferably in the range of 1300-2200 Nl/l.

The hydroprocessing steps are highly exothermic reactions in which the temperature can rise to a level which is detrimental to the stability of the catalyst and/or product quality. In some cases, it may be necessary to control the temperature variations. Recirculation of at least a portion of the product stream and/or effluent gas provides an efficient means for constraining the exothermic reaction whereby the recycled streams acts as media lowering the temperature of the bed in a controlled manner.

In the present invention, the hydrocarbon or the mixture of hydrocarbons obtained from the reactor includes fuel grade hydrocarbon(s) having a boiling point of 380° C. or less. In order to be able to utilize the obtained hydrocarbon mixture in an optimum manner, the mixture is further subjected to separation for separating the mixture into various fuel grade hydrocarbon fractions. In one embodiment, the product fraction comprises middle distillate hydrocarbons. For example, a hydrocarbon fraction having a boiling point typical in the diesel range, i.e. from 160° C. to 380° C. is obtained, meeting the specification of EN 590 diesel.

In the separation, also hydrocarbon fractions distilling at temperatures ranging from 40° C. to 210° C. and at a temperature of about 370° C. may be obtained.

These fractions are useful as high quality gasoline fuel and naphta fuel, respectively, or as blending components for these fuels. Said hydrocarbon fractions can also be used as blending components in standard fuels.

Another object of the invention is to provide an apparatus for producing hydrocarbons. The apparatus is adapted for realizing an embodiment of the process of the invention. The apparatus comprises a reactor (1) comprising at least two catalyst layer (3, 3') of HDO and HDW catalysts wherein the proportion of the HDW catalyst grows towards the bottom of the reactor, an inlet conduit (4) for introducing feed material to the reactor a hydrogen inlet conduit (5) for introducing hydrogen to the reactor a product outlet conduit (10) for recovering hydrocarbons from the reactor.

In one embodiment of the invention, in the lowest catalyst layer of the reactor the sole catalyst is HDW.

Figure 2:
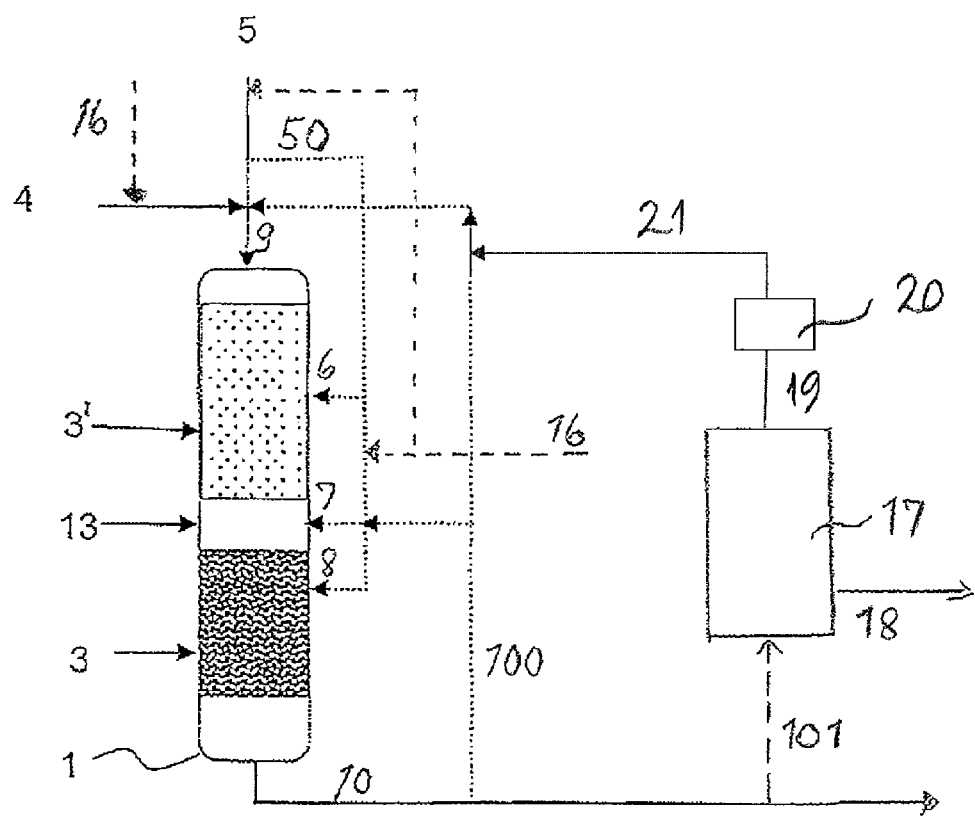
FIG. 2 shows an embodiment of an apparatus of the invention comprising one reactor where the catalyst system is packed in two separate layers in the reactor.

FIG. 2 shows an embodiment of an apparatus of the invention where a catalyst system is packed in two separate layers, a first catalyst layer (3') and a second catalyst layer (3), in the reactor (1).

With reference to FIG. 2, feed material such as crude tall oil is supplied to the reactor (1) via the inlet conduit (4).

Hydrogen is supplied via conduit (5) to the reactor (1). The conduit (5) enters the reactor (1) at an initial end of the reactor. Hydrogen can also enter the reactor at a position where the catalyst layers (3, 3') are arranged in the reactor, as shown by the dotted line (50).

A first catalyst layer (3') and a second catalyst layer (3) are packed in the reactor. The first catalyst layer (3') is arranged upstream of the second catalyst layer (3). The HDO and HDW catalysts are mixed and packed in the catalyst layers (3') and (3) so that the ratios of the HDO and HDW catalysts change gradually towards the bottom of the reactor and the proportion of the HDW catalyst grows towards the bottom of the reactor.

Hydroprocessing treatment and isomerisation/cracking of the feed material are accomplished in the reactor (1).

Further, an intermediate guard layer (13) can be disposed between the catalyst layers to prevent the layers from mixing with each other and to facilitate the operating of the catalyst layers at different temperatures when needed.

The $H_2$ feed can be supplied to the reactor also via the $H_2$ feed pipe (50) at one or more locations denoted by reference numbers 6, 7 and 8. When appropriate, the $H_2$ feed can be divided so that a part of the $H_2$ feed is supplied to the catalyst layer 3' and a part of it is supplied to the catalyst layer 3, as shown in FIG. 2.

External sulphur can be supplied via sulphur feed pipe (16) to the reactor (1), if appropriate. Also, the external sulphur feed can be divided so that a part of the external sulphur feed is supplied to the catalyst layer 3' and a part of it is supplied to the catalyst layer 3.

The catalyst materials used in the catalyst layers 3' and 3 must be activated before they are effective. The activation comprises several steps, of which one is treating the catalyst with activating sulphur compound, for example dimethyl disulphide. The activation of catalysts is common knowledge in the art and will thus not be discussed here in detail.

Product is recovered from the reactor (1) via product outlet pipe (10). At least a portion of the product can be supplied via pipe 101 to a separating reactor 17 for isolating any component from the mixture of the product components. One or more of the isolated components can be recovered via pipe 18 as depicted in FIG. 2.

Excess hydrogen and light gaseous compounds including $H_2S$ formed in the hydroprocessing treatment can be led via conduit 19 to a hydrogen separator 20. Hydrogen is recovered and circulated via hydrogen circulation conduit 21 back to hydrogen inlet conduit 5.

Figure 3:
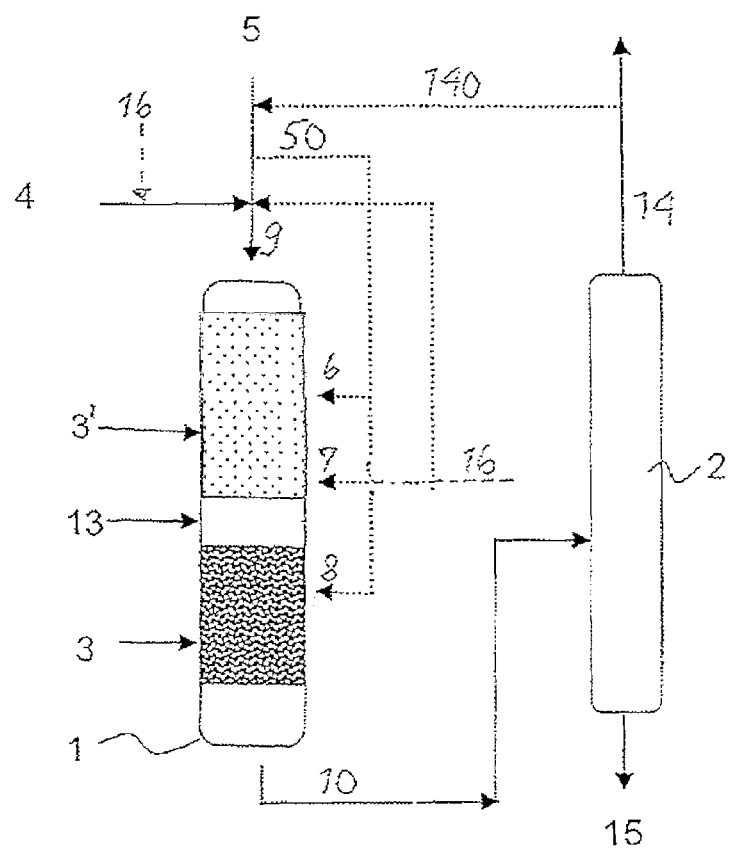
FIG. 3 shows an embodiment of an apparatus of the invention comprising a reactor and a hydrogen sulphide separator.

As in an embodiment illustrated in FIG. 3, a product recovered via product outlet pipe 10 can be further led to a $H_2S$ removal step 2. In the $H_2S$ removal reactor 2, gaseous compounds composed predominantly of hydrogen sulphide, hydrogen and methane are removed from the product via pipe 14. This can be accomplished for example by stripping, flashing or bubbling with inert gas, such as nitrogen.

When supplementary sulphur supply is desired, at least part of the gaseous compounds recovered from the reactor 2 can be recirculated back to reactor 1 via $H_2S$ recirculation pipe 140 as shown in FIG. 2 by a dotted line. Supplementary sulphur can also be supplied to the reactor 1 from an outer source via sulphur feed pipe 16 through inlets 6, 7 and/or 8.

A further object of the invention is to provide a reactor comprising at least two catalyst layers comprising HDO and HDW catalysts wherein the proportion of the HDW catalyst grows towards the bottom of the reactor. In one embodiment of the invention, the reactor comprises three catalyst layers. In another embodiment, the particle size of the catalysts diminishes from the top of the reactor towards the bottom of the reactor. In a further embodiment, the reactor comprises HDO catalyst selected from the group consisting of $NiO/MoO_3$, $CoO/MoO_3$, a mixture of $NiO/MoO_3$ and $CoO/MoO_3$ on a support selected from $Al_2O_3$ and $Al_2O_3$—$SiO_2$, and HDW catalyst NiW on a support selected from $Al_2O_3$, zeolite, zeolite-$Al_2O_3$, and $Al_2O_3$—$SiO_2$.

The following examples are presented for further illustration of the invention without limiting the invention thereto.

Example 1

The catalyst layers of a five layer reactor are shown in Table 1.

TABLE 1

| Layer No. | HDW/% | HDO/% |
|---|---|---|
| 1 | 5 | 95 |
| 2 | 25 | 75 |
| 3 | 50 | 50 |
| 4 | 75 | 25 |
| 5 | 100 | 0 |

Example 2

The catalyst layers of a four layer reactor are shown in Table 2.

TABLE 2

| Layer No. | HDW/% | HDO/% |
|---|---|---|
| 1 | 5 | 95 |
| 2 | 25 | 75 |
| 3 | 50 | 50 |
| 4 | 100 | 0 |

Example 3

The catalyst layers of a reactor are shown in Table 3.

TABLE 3

| Layer No. | HDW/% | HDO/% |
|---|---|---|
| 1 | 5 | 95 |
| 2 | 25 | 75 |
| 3 | 100 | 0 |

Example 4

The catalyst layers of a reactor are shown in Table 4.

TABLE 4

| Layer No. | HDW/% | HDO/% |
|---|---|---|
| 1 | 5 | 95 |
| 2 | 75 | 25 |
| 3 | 100 | 0 |

Example 5

The catalyst layers of a reactor are shown in Table 5.

TABLE 5

| Layer No. | HDW/% | HDO/% |
|---|---|---|
| 1 | 5 | 95 |
| 2 | 100 | 0 |

Example 6

The catalyst layers of a reactor containing a pre-HDO layer are shown in Table 6.

TABLE 6

| Layer No. | HDW/% | HDO/% |
|---|---|---|
| 1 |  | 100 |
| 2 | 5 | 95 |
| 3 | 50 | 50 |
| 4 | 100 | 0 |

Example 7

The catalyst layers of a reactor containing a pre-HDO layer are shown in Table 7.

TABLE 7

| Layer No. | HDW/% | HDO/% |
|---|---|---|
| 1 |  | 100 |
| 2 | 5 | 95 |
| 3 | 75 | 25 |
| 4 | 100 | 0 |

Example 8

The catalyst layers of a reactor containing diluted HDO and HDW catalysts are shown in Table 8.

TABLE 8

| Layer No. | HDW/% | HDO/% | Inert material/% |
|---|---|---|---|
| 1 | 5 | 20 | 75 |
| 2 | 10 | 25 | 65 |
| 3 | 25 | 25 | 50 |
| 4 | 50 | 10 | 40 |
| 5 | 80 | 0 | 20 |

Example 9

A laboratory reactor is packed with two catalyst layers, wherein the first layer comprises a mixture of HDO catalyst granules and HDW catalyst granules and the second layer comprises only HDW catalyst granules. The HDO catalyst contains $NiMo/Al_2O_3$ as active catalyst and the HDW catalyst contains $NiW/Al_2O_3$ as active catalyst.

In the first layer 10% HDW catalyst granules are mixed with 90% HDO catalyst granules. The second layer contains 100% HDW catalyst.

An inert guard bed containing glass beads is packed on top of the first catalyst layer. The catalysts are sulphided with $H_2S$ prior to start up.

The feed is composed of crude tall oil, which has been purified by depitching before being fed to the reactor. Hydrogen gas is fed into the reactor together with the feed CTO.

The purified CTO is fed into the reactor at a rate of 28 g/h and hydrogen is fed at 70 l/h. The reaction conditions are as follows:

| | |
|---|---|
| WHSV | 0.69 |
| Pressure | 70 bar |
| Temp. | 364-372° C. |
| $H_2$/feed | 2320 Nl/l |

The product is cooled and gaseous components, mainly $H_2$, $H_2S$, CO and $CO_2$ are removed. The produced water is also removed from the hydrocarbon product. The obtained hydrocarbon mixture is distilled and separated into three fractions containing a) gases (C1 to C4), b) light hydrocarbons (C5 to C9) and c) middle distillate (C10 to C28).

The fractionation is controlled by monitoring the flash point of the middle distillate product. Three different runs of middle distillate fractions are analysed for diesel fuel properties and found to have the following flash point (FP), cloud point (CP) and cold filter plug point (CFPP):

| Property (° C.) | Run 1 | Run 2 | Run 3 |
|---|---|---|---|
| FP | 64 | 64 | 66 |
| CP | −1 | −3 | −8 |
| CFPP | −3 | −6 | −10 |

The results indicate that the CTO has been converted into a satisfactory middle distillate product with a good flash point and acceptable cold properties. The middle distillate is suitable for blending into diesel fuel.

The invention claimed is:

1. A process for producing a hydrocarbon or a mixture thereof, comprising:
introducing feed consisting of biological material into a reactor, which comprises at least two catalyst layers, comprising HDO and HDW catalysts, wherein the HDO catalyst is selected from the group consisting of NiMo, CoMo, and a mixture of NiMo and CoMo, wherein the HDW catalyst is NiW, and wherein the proportion of the HDW catalyst increases towards the bottom of the reactor, treating the feed material in the reactor to produce at least one hydrocarbon, and recovering the hydrocarbon or a mixture thereof.

2. The process according to claim 1 characterized in that the feed of biological origin is selected from the group consisting of
a) plant fats, plant oils, plant waxes; animal fats, animal oils, animal waxes, fish fats, fish oils, fish waxes;
b) fatty acids or free fatty acids obtained from plant fats, plant oils, plant waxes; animal fats, animal oils, animal waxes; fish fats, fish oils, fish waxes, and mixtures thereof by hydrolysis, transesterification or pyrolysis;
c) esters obtained from plant fats, plant oils, plant waxes; animal fats, animal oils, animal waxes; fish fats, fish oils, fish waxes, and mixtures thereof by transesterification;
d) metal salts of fatty acids obtained from plant fats, plant oils, plant waxes; animal fats, animal oils, animal waxes; fish fats, fish oils, fish waxes, and mixtures thereof by saponification;
e) anhydrides of fatty acids from plant fats, plant oils, plant waxes; animal fats, animal oils, animal waxes; fish fats, fish oils, fish waxes, and mixtures thereof;
f) esters obtained by esterification of free fatty acids of plant, animal and fish origin with alcohols;
g) fatty alcohols or aldehydes obtained as reduction products of fatty acids from plant fats, plant oils, plant waxes; animal fats, animal oils, animal waxes; fish fats, fish oils, fish waxes, and mixtures thereof;
h) recycled food grade fats and oils, and fats, oils and waxes obtained by genetic engineering;
i) dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds;
j) compounds derived from algae, and
k) mixtures of the above raw materials.

3. The process of claim 2 wherein the feed material comprises crude tall oil.

4. The process of claim 3 wherein the crude tall oil is purified prior to subjecting it to the reactor.

5. The process of claim 1 wherein
the HDO catalyst is selected from the group consisting of $NiO/MoO_3$, $CoO/MoO_3$, and a mixture of $NiO/MoO_3$ and $CoO/MoO_3$ on a support selected from the group consisting of $Al_2O_3$ and $Al_2O_3$—$SiO_2$, and
the HDW catalyst is NiW on a support selected from the group consisting of $Al_2O_3$, zeolite, zeolite-$Al_2O_3$, and $Al_2O_3$—$SiO_2$.

6. The process of claim 5 wherein the HDO and HDW catalysts are mixed and packed in the reactor.

7. The process of claim 5 wherein HDW catalyst is mixed with HDO catalyst in the topmost section of the reactor.

8. The process of claim 1 wherein the pumping speed WHSV of the feed material is 0.1-5.

9. The process of claim 1 wherein the reactor comprises three layers.

10. The process of claim 1 wherein the particle size of the catalysts diminish from the top of the reactor towards the bottom of the reactor.

11. The process of claim 1 wherein the mixture of hydrocarbons is subjected to separation to separate different fuel range hydrocarbon fractions.

12. A process for producing a hydrocarbon or a mixture thereof, comprising:

introducing a feed of biological material into a reactor, which comprises at least two catalyst layers, comprising HDO and HDW catalysts wherein the proportion of the HDW catalyst increases towards the bottom of the reactor, and the HDO catalyst is selected from the group consisting of NiMo, CoMo, and mixtures of NiMo and CoMo, and the HDW catalyst is NiW, treating the feed material in the reactor to produce at least one hydrocarbon, and recovering the hydrocarbon or a mixture thereof.

* * * * *